United States Patent [19]

Merz

[11] 4,083,531

[45] Apr. 11, 1978

[54] SYSTEM AND DEVICE FOR MECHANICALLY AND SIMULTANEOUSLY STRETCHING OUT A PLURALITY OF WIRES OR A PLURALITY OF TRACTION ROPES ON AERIAL ELECTRICAL LINES

[75] Inventor: Otto Merz, Schaffhausen, Switzerland

[73] Assignee: Luxa A.G., Vaduz, Liechtenstein

[21] Appl. No.: 732,397

[22] Filed: Oct. 14, 1976

[30] Foreign Application Priority Data

Oct. 31, 1975 Switzerland .................... 14128/75

[51] Int. Cl.² ........................................... B65H 59/00
[52] U.S. Cl. ...................... 254/134.3 R; 24/201 HE
[58] Field of Search ........ 254/135 CE, 173 R, 190 R, 254/183, 184, 134.3 PA, 134.3 R; 104/115; 212/8 R, 94, 117; 24/201 LP, 201 R, 201 HE, 201 SL

[56] References Cited

U.S. PATENT DOCUMENTS

| 746,197 | 12/1903 | Strickler | 24/201 LP |
| 1,793,395 | 2/1931 | Gam | 212/117 |
| 2,738,477 | 3/1956 | Matthysse | 24/201 SL |
| 3,261,066 | 7/1966 | Chamberlin | 24/201 HE |
| 3,545,724 | 12/1970 | Wright | 254/134.3 PA |
| 3,908,962 | 9/1975 | Ross | 254/134.3 R |

Primary Examiner—Trygve M. Blix
Assistant Examiner—Kenneth Noland

[57] ABSTRACT

System for mechanically and simultaneously stretching out a plurality of wires or a plurality of traction ropes on aerial electrical lines by using a single traction rope coupled at one end to a winch and at the other end to a mounting device fitted with individual coupling and drawing elements for the single wires or single traction ropes thereof, wherein time by time an automatic simultaneous insertion of such traction ropes or wires occurs on the support, pole or trestle provided along the aerial electrical line.

6 Claims, 8 Drawing Figures

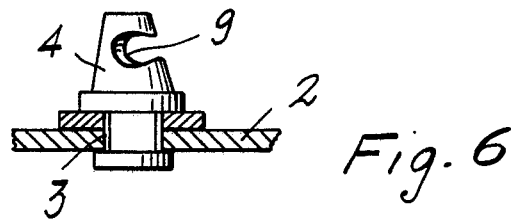
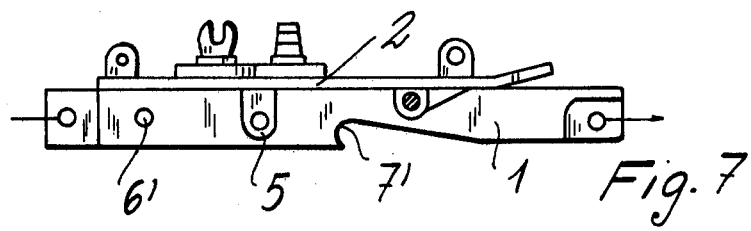
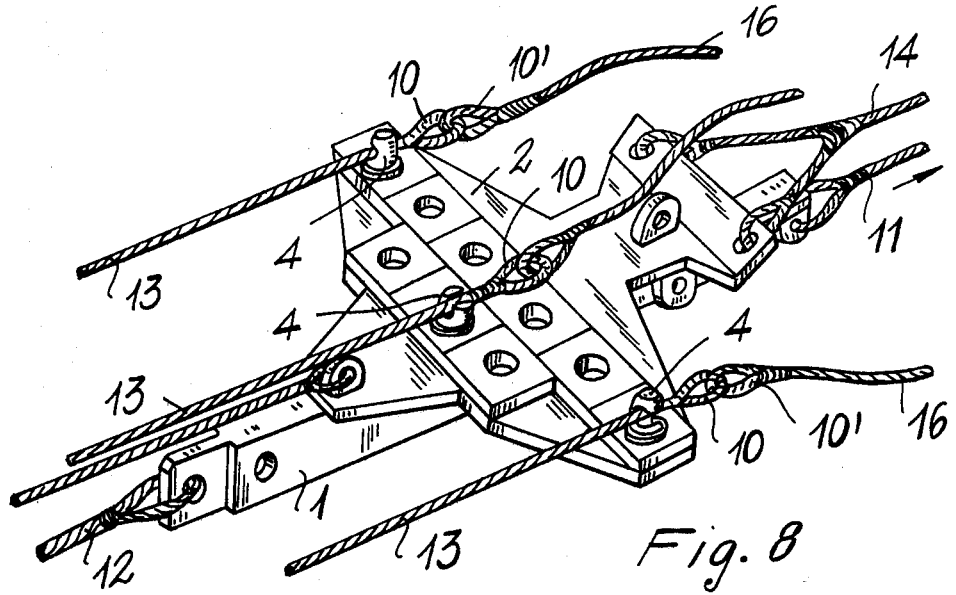

SYSTEM AND DEVICE FOR MECHANICALLY AND SIMULTANEOUSLY STRETCHING OUT A PLURALITY OF WIRES OR A PLURALITY OF TRACTION ROPES ON AERIAL ELECTRICAL LINES

This invention relates to a system and device for mechanically and simultaneously stretching out of a plurality of wires or traction ropes on aerial electrical lines.

As known, when stretching out wires and guide ropes of aerial electrical lines, hitherto the common practice was to previously stretch out by hand, or with the aid of machines or small winches, and sometimes even by means of helicopters, as many pilot ropes as the phases of wires and guide ropes to be stretched out.

This would involve substantial burdens, such as supplies of large amounts of strings of various sections, stretching out thereof through obstructions and unevennesses in the ground, and with a still increasing investment of labour. It should also be noted that previous cutting of forests and trees on the line layout just because of this stretching out method is sometimes superior to that required by standard line operation, thus causing unnecessary damages to cultivations in the layout.

The system according to the present invention for mechanically and simultaneously stretching out a plurality of wires or traction ropes on aerial electrical lines is characterized by comprising the steps of conventionally stretching out a first pilot rope or a first traction rope, in case later replaced by traction ropes of a larger diameter; pulling said traction rope by means of a winch or like device at one end after a suitable amount of spans, and at the other end of said traction rope coupling a mounting unit provided with individual supporting elements for the single/traction ropes of each wire or for each wire to be stretched out; feeding said traction rope with said mounting unit to the close proximity of a pole or a trestle, on the opposite side with respect to said winch the end of said ropes being braked at the same time; anchoring said mounting unit when closely located to a pole or trestle by a tackle which in turn is anchored to or at the pole; anchoring a corresponding length to said ropes or cables carried on said unit, one length for each of the ropes or cables, said lengths being already pulleyed and preset on the pole and capable of overrunning the pole on the respective pulleying locations thereof to engage on a next support and traction unit carried on the traction rope beyond the trestle or pole; disconnecting the first carrying body in front of the pole in the incoming direction, so that all of the previously drawn ropes or the like are in turn brought by said lengths thus placed in position to the desired positions on the pole; disconnecting the tackle and continuing then beyond the trestle or pole to further pulling the traction rope and hence the assembly of ropes coupled on the next mounting unit to reach the next pole or trestle in the line and then carrying out the same set of operations.

A device according to the present invention for mechanically and simultaneously stretching out a plurality of wires or traction ropes in aerial electrical lines is characterized by comprising a base mounting member engaged on the traction rope, and a rope or cable holder plate which in turn is engaged with said member so as to be removable as required, wherein said plate includes a plurality of holes having inserted therein said supporting elements made as studs and orientable in said holes and provided with a shape seat for traction rope or cable positioning, wherein said shaped seat has a shape corresponding to that of a compression sleeve or clamp element of loops at the rope ends.

These and further objects, characteristics, details and advantages of the system and device according to the present invention will become apparent to those skilled in the art from the following detailed description of an embodiment given by way of unrestrictive example, with reference to the accompanying drawings, in which:

FIGS. 4, 5 and 6 are detailed views showing anchoring studs or blocks for the traction ropes, which studs are provided on the traction plate shown in FIG. 3;

FIG. 7 is a side view showing the unit comprising the elements of FIGS. 2 and 3; and FIG. 8 is a schematic perspective view of said unit with the mounting plate at the position corresponding to FIG. 1, that is at length coupling position.

Figure 1:
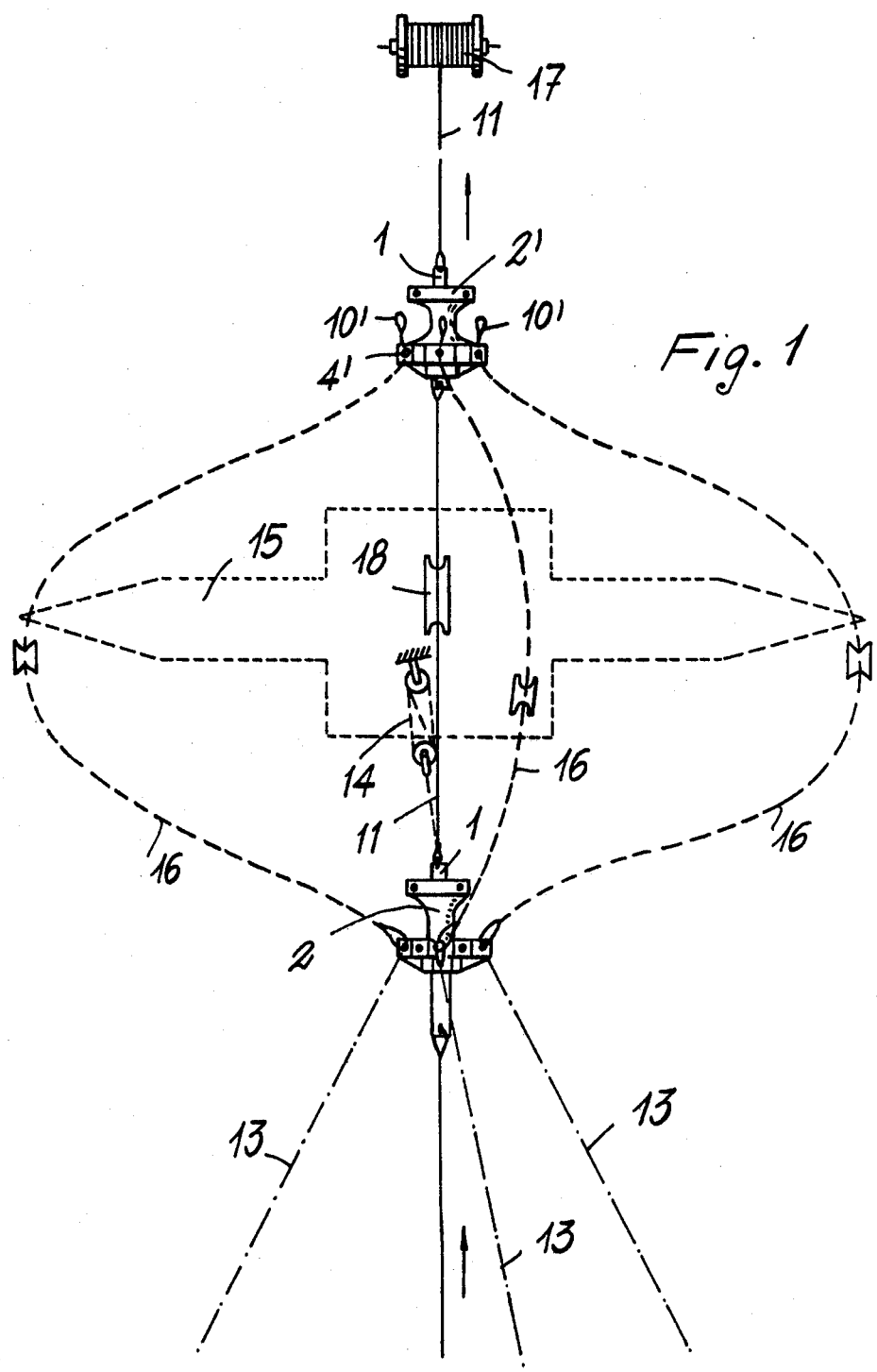
FIG. 1 is a schematic plan view showing an assembly of ropes or wires on overrunning a trestle by means of a device and system according to the invention.
Figure 2:
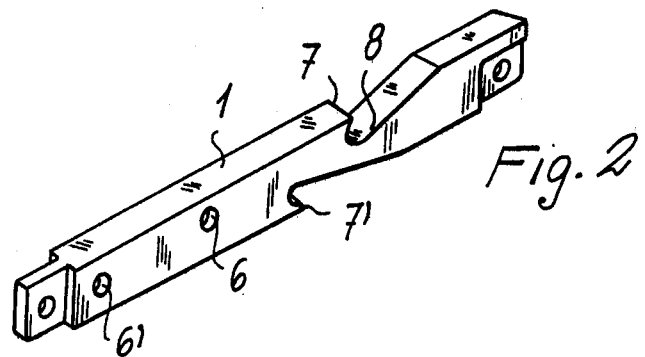
FIGS. 2 and 3 are perspective views respectively showing the base carrying member and cable holder plate to be engaged with said member and intended as a whole to make up the unit to be applied for traction between the traction rope and the other traction rope or wire.
Figure 3:
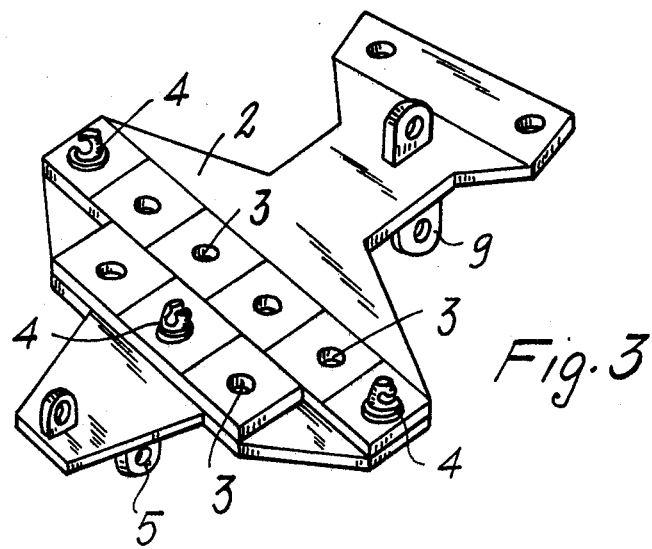
Figure 4:
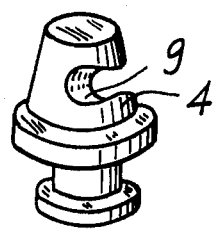
Figure 5:
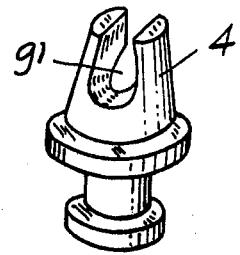

For a better understanding of the invention, the device according to FIGS. 2 through 8 will be first described. Such a device comprises a base carrying member 1 and a rope or cable holder plate 2 intended to be engaged therewith. Member 1 is intended for insertion between the traction rope and the other traction rope or wire, whereas plate 2 has a plurality of holes 3, in which blocks or studs 4 are orientably mounted, each of which are better shown in FIGS. 4, 5 and 6 and orientable in the seats thereof on plate 2 and intended for coupling of the ropes or cables to be pulled.

The unit comprising said elements 1 and 2 is shown in FIG. 7. As shown, plate 2 is secured on member 1 by a pin inserted, for example, in a fork trunnion 5 in plate 2 and corresponding hole 6 in member 1, the latter in turn having at the top or at the bottom a recess 7 or 7' and an opposite sloping surface on said member 1, so that in the recess 7 adjacent the sloping surface, for example at 8, a pin is seated as inserted in a fork trunnion 9 provided in plate 2. Thus, a possible removable connection is assured between base member 1 and plate 2. Although not shown in the figures, member 1 is in turn made of adjoining and articulated sections in the direction of the longitudinal axis in order to pass the race of the pulleys being encountered in its travel with the traction rope.

As above mentioned, the various cables or the like intended to be pulled are coupled on blocks 4 orientably mounted on plate 2. Such blocks 4 have a nicked seat 9 or 9' with a groove that in section exactly corresponds to the compression sleeve or particular ring-like clamp element which is applied on the cable. Thus, the rope end to be coupled on plate 2 is simply folded as a loop, as shown at 10 of FIG. 8, and then the loop closed with said clamp member is applied to the plate so that said compression sleeve is brought to position.

In FIG. 8, reference numeral 11 designates the traction rope, the running direction of which is shown by the arrow, as provided by a winch. At the opposite end of member 1, reference numeral 12 designates a rope that can be a traction rope or a drive rope for that step which is also braked along with the whole assembly of ropes or cables 13. In order not to further complicate the illustration, only three ropes or cables 13 are shown in FIG. 8, that is the simplest example of electrical line has been chosen, but it being apparent that the system and device according to the invention could be applied, as above shown, with still greater advantages in high-voltage lines both with single and bundle wires, wherein in addition to the wires also the guide ropes are stretched out.

FIG. 8 shows the device according to the invention at the position corresponding to the general schematic plan view of FIG. 1, that is at the position in which the unit comprising elements 1 and 2 along with the cable being pulled has arrived adjacent a pole or trestle. Still in FIG. 8, reference numeral 14 designates as a whole a tackle anchored to the trestle for disconnecting and holding momentarily stationary said rope holder plate 2, after the latter has arrived adjacent said trestle.

Referring now to FIG. 1, reference numeral 15 denotes as a whole a trestle, having anchored thereon a tackle schematically shown at 14. A winch located after the trestle or after a determined plurality of trestles is here shown at 17. Assuming that initially the pilot cord has been already stretched out and that accordingly positioning has been already provided for traction rope 11 with the individual cables 13 arranged on said plate 2, as shown in FIG. 8, upon operation of winch 17 said member 1 and plate 2 carried thereon, and hence the assembly of traction ropes 13, will have reached the position shown in FIG. 1, that is the position in front of a trestle or a pole, on which elements 13 are now stretched out for then proceeding to the operation on the other side of said trestle 15.

To this end, the invention contemplates that on the trestle for each of the incoming elements 13 a previously pulleyed length 16 is preset. When the traction unit 1, 2 arrives adjacent the pole, the operator on the trestle will disconnect plate 2 through operation of tackle 14, which, after unthreading of pin 5, will cause pin 9 to slide along the chute and disconnection thereof from the proper holding recess 7 or 7'. The operator will also provide for coupling on loops 10 of elements 13 the corresponding loops 10 of lengths 16, which at the other side or end have similar loops 10' which will be inserted on corresponding elements or blocks 4' of a plate 2' similar to plate 2, which will then be mounted on said support 1 that, after being cleared of plate 2, as above mentioned, is moved to the other side of trestle 15 by short operation of winch 17.

When this has been done for all of the individual elements 16, and the pin has been inserted between plate 2' and member 1 in the above described hole 6 or 6', this plate 2' is now held on member 1, and by re-operating winch 17 stretching to the next pole is carried out. In turn elements 13 that are inserted on blocks 4 when on the other side of the pole pull is continued by winch 17, while loosening at the same time the anchorage provided by the tackle, will move out of blocks 4, and due to lengths 10, which are now connected on one side with said elements 13 and on the other side with blocks 4' on the other plate 2' on the other side of trestle 15, will automatically move to their positions provided on the trestle, or will project out of blocks 4 of plate 2 which, as above mentioned, is in turn completely disconnected from tackle 14. Therefore, at the position preceding the trestle just passed, that is at the bottom of FIG. 1, said cables 13 will no longer converge to the centre, where they were anchored on blocks 4 of plate 2, but will be already aligned at the various positions provided on the pole. The pull action will now continue on the other side of the pole to reach a next trestle, where the above described operations will be carried out, that is at this new pole the new plate 2' will be disconnected and hence the separation of the plate and removal of the cables from blocks 4' will occur with a resulting automatic insertion in the positions provided on the other pole owing to the provision of further lengths similar to lengths 16 previously arranged time by time on each of the trestles. Thus the process is continued until stretching out has been effected on the entire line or line section. It should be particularly noted that, as above stated, an individual member 1 remaining on the traction rope can, owing to its configuration and articulated sections not shown in the figures, to pass the several pulleys being encountered in its travel, while plate 2 or 2' is time by time disconnected in front of each trestle or pole and the other plate is immediately mounted again beyond said pole.

Although the invention has been here described with reference particularly to an electrical single-wire line, herein quite schematically shown, the system and device according to the invention are applicable to any type of aerial electrical lines. It should also be noted that, as a variant to the described system, in addition to being anchored at any location of the pole, said tackle can replace a section of traction rope at the pole.

Particularly, as above mentioned, besides by the system described in FIG. 1, said plate 2 can be disconnected from member 1 also by a tackle that, passing through mounting pulleys prearranged at the top or at the bottom of the sliding plane for pulley 18, depending on whether said plate 2 has been applied at the top or at the bottom to member 1, has its anchoring locations on said plate 2 and on a suitable coupling as previously inserted on the traction rope 11 at a distance of 3–4 meters from mounting member 1. These two systems would allow an easier disconnection of plate 2 from mounting member 1, would not cause any stress to the support and allow said mounting member 1 to move beyond pulley 18 by momentarily loosening said tackle, which is to be done just after the connections of lengths 16 to traction ropes 13 and said disconnection of plate 2 from the mounting member, all of the other operations being left unaltered.

What is claimed is:

1. A method for mechanically and simultaneously stretching out a plurality of wires or a plurality of traction ropes on aerial electrical lines, the method comprising the steps of:
   conventionally stretching out a pilot cord or traction rope over a plurality of spans between supporting poles or towers;
   pulling one end of said traction rope by a winch or like device;
   coupling a mounting unit provided with individual bearing elements for the single traction ropes of each wire or for each wire to be stretched out at the other end of said traction rope;
   feeding said traction rope along with said mounting unit to the immediate proximity of a pole or a trestle, the end of said ropes on the opposite side relative to said winch being at the same time braked;

anchoring said mounting unit when in the immediate proximity of a pole or trestle by means of a tackle which is in turn anchored to the pole or at the pole;

providing pulleys at the locations on the pole or trestle where the cables are to be secured, the pulleys having lengths of rope or cable therethrough;

coupling respective ones of said lengths of rope or cable in said pulleys to said ropes or wires engaged on said unit, said lengths being previously pulleyed and prearranged on the pole and being capable of overrunning the pole on the respective pulleying locations thereof to engage on a next mounting unit mounted on the traction rope beyond said trestle or pole;

allowing the disconnection of the first mounting unit which is in front of the pole in the arrival direction, so that all of the previously towed ropes or the like will in turn reach the desired positions on the pole by said lengths thus inserted in position;

disconnecting the tackle and then proceeding beyond the trestle or pole to further pulling the traction rope and hence the assembly of ropes coupled on the next mounting unit to reach the next pole or trestle in the line and then perform the same set of operations.

2. A method according to claim 1, wherein said ropes or cables have the ends thereof in a loop fashion, in which each of the loops in the running or traction direction are inserted on orientable supporting elements provided in said unit and projecting therefrom.

3. A method according to claim 2, wherein said lengths prearranged on each of the poles or trestles have the two ends thereof in a loop fashion, in which the end of each of the lengths facing the side of the incoming mounting unit is coupled with its loop to the projecting loop of the ropes or cables inserted on the supporting elements of the incoming mounting unit, whereas the end of each of the lengths on the opposite side of the trestle in the outgoing direction is inserted on corresponding orientable supporting blocks provided in a corresponding mounting unit.

4. A device for mechanically and simultaneously stretching out a plurality of wires or a plurality of traction ropes having a compression sleeve or loop clamping element on an end thereof on aerial electrical lines, comprising:

a base supporting member engaged on a first traction rope;

a rope or cable holder plate;

connection means for removably connecting said plate to said member so as to be selectively removable therefrom, said removable connection means comprising an unthreadable stop pin and a coupling means including a pin attached to said plate and a cooperating recess in said base member for releasably receiving said pin, said member having a sloping surface adjacent said recess for aiding in releasably coupling said member to said plate, said plate including a plurality of holes, and a plurality of stud-like supporting elements secured in said holes and provided with a shaped seat for positioning and engaging further traction ropes or cables, said shaped seat having a shape corresponding to that of the compression sleeve or loop clamping element at the rope ends and extending essentially parallel to said plate.

5. A device according to claim 4, wherein said base supporting member is made with elements for upper and lower disconnection of said cable holder plate.

6. A device according to claim 4, wherein said base supporting member has a plurality of articulated sections in its longitudinal direction, whereby said supporting member can pass through the grooves of pulleys.

* * * * *